(12) United States Patent
Wilson et al.

(10) Patent No.: US 9,594,462 B2
(45) Date of Patent: Mar. 14, 2017

(54) UNIFORM SIGNALS FROM NON-UNIFORM PATTERNS OF ELECTRODES

(71) Applicant: CYPRESS SEMICONDUCTOR CORPORATION, San Jose, CA (US)

(72) Inventors: Cole Wilson, Everett, WA (US); Jon Peterson, Everett, WA (US); Benjamin Avery, Bellingham, WA (US); Oleksandr Hoshtanar, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 21 days.

(21) Appl. No.: 14/097,126

(22) Filed: Dec. 4, 2013

(65) Prior Publication Data

US 2014/0313159 A1    Oct. 23, 2014

Related U.S. Application Data

(60) Provisional application No. 61/814,536, filed on Apr. 22, 2013.

(51) Int. Cl.
G06F 3/041 (2006.01)
G06F 3/044 (2006.01)

(52) U.S. Cl.
CPC ............ *G06F 3/044* (2013.01); *G06F 3/0416* (2013.01); *G06F 2203/04111* (2013.01); *G06F 2203/04112* (2013.01)

(58) Field of Classification Search
CPC ............... H03K 17/962; H03K 17/955; H03K 17/9645; G01D 5/24; G06F 2203/04111; G06F 2203/04112

(Continued)

(56) References Cited

U.S. PATENT DOCUMENTS 5,045,644 A    9/1991 Dunthorn
9,207,814 B2 * 12/2015 Yilmaz .................. G06F 3/044

(Continued)

FOREIGN PATENT DOCUMENTS

CN    101882041 A    11/2010
CN    102023767 A    4/2011
WO    2013121183 A1   8/2013

OTHER PUBLICATIONS

Blankenship, Tim, "Projected-Capacitive Touch Systems from the Controller Point of View," Maxim Integrated APP 5047 Tutorial 5047, Jun. 10, 2011; 4 pages.

(Continued)

*Primary Examiner* — Michael Faragalla
*Assistant Examiner* — William Lu
(74) *Attorney, Agent, or Firm* — Lowenstein Sandler LLP

(57) ABSTRACT

Apparatuses and methods of sense arrays with non-uniform patterns are described. One capacitive-sense array includes a first set of electrodes and a second set of electrodes. The first set of electrodes intersect the second set of electrodes to form a unit cells each corresponding to an intersection of a pair of electrodes comprising one electrode from the first set and one electrode from the second set. At one of the second set of electrodes includes a non-uniform conductive pattern including a first region being located at the intersection of the respective unit cell and a distal region being at a location within the respective unit cell that is farther away from the intersection than the first region. The first region includes a first conductive surface area and the distal region includes a second conductive surface area that is greater than the first conductive surface area.

20 Claims, 11 Drawing Sheets

(58) Field of Classification Search
USPC .......................................... 345/156, 173–179
See application file for complete search history.

(56) References Cited

U.S. PATENT DOCUMENTS

| | | | |
|---|---|---|---|
| 2003/0132920 | A1 | 7/2003 | Lee et al. |
| 2005/0184965 | A1 | 8/2005 | Geaghan et al. |
| 2007/0222766 | A1 | 9/2007 | Bolender |
| 2009/0021267 | A1 | 1/2009 | Golovchenko et al. |
| 2009/0213082 | A1* | 8/2009 | Ku ................................. 345/173 |
| 2010/0060596 | A1 | 3/2010 | Whight |
| 2010/0079393 | A1* | 4/2010 | Dews ............................. 345/173 |
| 2010/0302201 | A1 | 12/2010 | Ritter et al. |
| 2011/0080353 | A1 | 4/2011 | Kang et al. |
| 2011/0109572 | A1 | 5/2011 | Deslippe et al. |
| 2011/0157079 | A1* | 6/2011 | Wu .......................... G06F 3/044 345/174 |
| 2011/0227858 | A1* | 9/2011 | An et al. ....................... 345/174 |
| 2011/0290631 | A1* | 12/2011 | Kuriki ..................... G06F 3/044 200/600 |
| 2011/0308846 | A1* | 12/2011 | Ichiki ...................... G06F 3/044 174/257 |
| 2012/0019268 | A1 | 1/2012 | Tao et al. |
| 2012/0050214 | A1* | 3/2012 | Kremin et al. ................ 345/174 |
| 2012/0056664 | A1 | 3/2012 | Nam |
| 2012/0127118 | A1 | 5/2012 | Nolting et al. |
| 2012/0133611 | A1 | 5/2012 | Chai et al. |
| 2012/0212449 | A1* | 8/2012 | Kuriki .......................... 345/174 |
| 2013/0176247 | A1* | 7/2013 | Jogo ....................... G06F 3/041 345/173 |
| 2013/0207911 | A1* | 8/2013 | Barton et al. .................. 345/173 |
| 2013/0221991 | A1* | 8/2013 | Campbell ..................... 324/658 |
| 2013/0285975 | A1* | 10/2013 | Hong et al. ................... 345/174 |

OTHER PUBLICATIONS

Wu, Xiaoling, Touchware: A Software based Implementation for High Resolution Multi-touch Applications, IEEE 10th International Conference on Computer and Information Technology (CIT), Jun. 29, 2010-Jul. 1, 2010, pp. 1703-1710; 8 pages.

U.S. Appl. No. 13/631,369: "Sensor Array With Edge Pattern" Massoud Badaye et al., filed on Sep. 28, 2012; 60 pages.

Barna, L., The Use of Electromechanical Film (EMFi) Sensors in Building a Robust Touch-Sensitive Tablet-Like Interface, Sensors Journal, IEEE, Jan. 2007, pp. 74-80, vol. 1, IEEE Xplore Digital Library.

Cameron, A., Touch and Motion [tactile sensor], 1988 IEEE International Conference on Robotics and Automation, Apr. 24-29, 1988, pp. 1062-1067, vol. 2, IEEE Xplore Digital Library, Philadelphia, PA, USA.

Enhanced AccuTouch Technology Specifications, elo Touch Solutions, Jul. 2012, [retrieved on Sep. 27, 2012]. Retrieved from the Internet at http://www.elotouch.com/products/touchscreens/accutouch/enhanced_accutouch_specifications.pdf.

International Search Report for International Application No. PCT/US12/71060 dated Jan. 25, 2013; 5 pages.

International Search Report for International Application No. PCT/US14/33639 dated May 27, 2014; 3 pages.

USPTO Advisory Action for U.S. Appl. No. 13/631,369 dated May 2, 2013; 3 pages.

USPTO Advisory Action for U.S. Appl. No. 13/631,369 dated Dec. 26, 2013; 3 pages.

USPTO Final Rejection for U.S. Appl. No. 13/631,369 dated Feb. 13, 2013; 30 pages.

USPTO Final Rejection for U.S. Appl. No. 13/631,369 dated May 9, 2014; 43 pages.

USPTO Final Rejection for U.S. Appl. No. 13/631,369 dated Oct. 17, 2013; 39 pages.

USPTO Non-Final Rejection for U.S. Appl. No. 13/631,369 dated Feb. 19, 2014; 40 pages.

USPTO Non-Final Rejection for U.S. Appl. No. 13/631,369 dated Aug. 16, 2013; 32 pages.

USPTO Non-Final Rejection for U.S. Appl. No. 13/631,369 dated Dec. 28, 2012; 28 pages.

Written Opinion of the International Searching Authority for International Application No. PCT/US12/71060 mailed Jan. 25, 2013; 3 pages.

Written Opinion of the International Searching Authority for International Application No. PCT/US14/33639 dated May 27, 2014; 6 pages.

* cited by examiner

UNIFORM SIGNALS FROM NON-UNIFORM PATTERNS OF ELECTRODES

RELATED APPLICATIONS

This application claims the benefit of U.S. Provisional Application No. 61/814,536, filed Apr. 22, 2013, the entire contents of which are incorporated by reference herein.

TECHNICAL FIELD

The present disclosure relates generally to sensing systems, and more particularly to capacitance-sensing systems configurable to determine touch locations of touches on the capacitive-sensing systems.

BACKGROUND

Capacitance sensing systems can sense electrical signals generated on electrodes that reflect changes in capacitance. Such changes in capacitance can indicate a touch event (i.e., the proximity of an object to particular electrodes). Capacitive sense elements may be used to replace mechanical buttons, knobs and other similar mechanical user interface controls. The use of a capacitive sense element allows for the elimination of complicated mechanical switches and buttons, providing reliable operation under harsh conditions. In addition, capacitive sense elements are widely used in modern customer applications, providing interesting user interface options in existing products. Capacitive sense elements can range from a single button to a large number arranged in the form of a capacitive-sense array for a touch-sensing surface.

Transparent touch screens that utilize capacitive-sense arrays are ubiquitous in today's industrial and consumer markets. They can be found on cellular phones, GPS devices, set-top boxes, cameras, computer screens, MP3 players, digital tablets, and the like. The capacitive-sense arrays work by measuring the capacitance of a capacitive sense element, and looking for a delta in capacitance indicating a touch or presence of a conductive object. When a conductive object (e.g., a finger, hand, or other object) comes into contact or close proximity with a capacitive sense element, the capacitance changes and the conductive object is detected. The capacitance changes of the capacitive touch sense elements can be measured by an electrical circuit. The electrical circuit converts the measured capacitances of the capacitive sense elements into digital values.

There are two typical types of capacitance: 1) mutual capacitance where the capacitance-sensing circuit has access to both electrodes of the capacitor; 2) self-capacitance where the capacitance-sensing circuit has only access to one electrode of the capacitor where the second electrode is tied to a DC voltage level or is parasitically coupled to Earth Ground. A touch panel has a distributed load of capacitance of both types (1) and (2) and Cypress' touch solutions sense both capacitances either uniquely or in hybrid form with its various sense modes.

BRIEF DESCRIPTION OF THE DRAWINGS

The present invention is illustrated by way of example, and not of limitation, in the figures of the accompanying drawings.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Apparatuses and methods of sense arrays with non-uniform patterns are described. One capacitive-sense array includes a first set of electrodes and a second set of electrodes. The first set of electrodes intersect the second set of electrodes to form a unit cells each corresponding to an intersection of a pair of electrodes comprising one electrode from the first set and one electrode from the second set. At one of the second set of electrodes includes a non-uniform conductive pattern including a first region being located at the intersection of the respective unit cell and a distal region being at a location within the respective unit cell that is farther away from the intersection than the first region. The first region includes a first conductive surface area and the distal region includes a second conductive surface area that is greater than the first conductive surface area.

In another embodiment, a second electrode disposed in relation to a first electrode to form an intersection between the first electrode and the second electrode. The second electrode includes a non-uniform conductive pattern including more conductive surface area in one or more regions located farther away from a first region at which the intersection is located. In another embodiment, the non-uniform pattern includes conductive surface area at one or more edges of the non-uniform pattern than near the intersection.

The embodiments described herein are directed to specific geometries, but other geometries of the shapes and patterns can be utilized. In some embodiments, the non-uniform patterns can be used in one dimension. In other embodiments, the non-uniform patterns can be used in multiple dimensions. Various embodiments of the non-uniform patterns are described below with respect to FIGS. 3-10.

Figure 1:
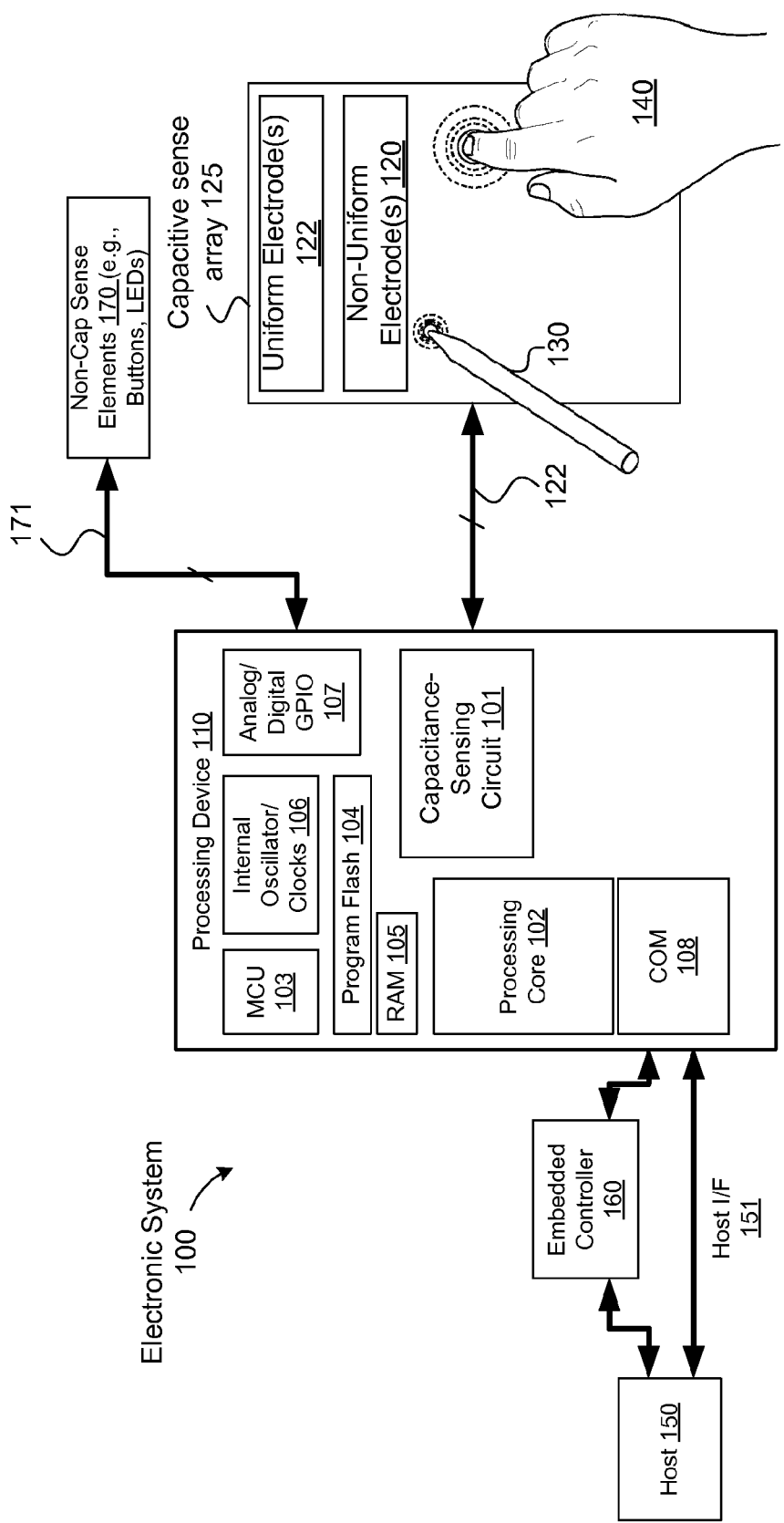
FIG. 1 is a block diagram illustrating one embodiment of an electronic system having a processing device coupled to a capacitive sense array with one or more non-uniform electrodes according to one embodiment.

FIG. 1 is a block diagram illustrating one embodiment of an electronic system 100 having a processing device 110 coupled to a capacitive sense array 125 with uniform electrodes 122 and non-uniform electrodes 120 according to one embodiment. Details regarding the non-uniform electrodes 120 are described in more detail with respect to FIGS. 3-10. In one embodiment, the processing device 110 includes the capacitance-sensing circuit 101 measures capacitance on one or more sense elements of the capacitive-sense array 125 coupled to the processing device 110. For example, the capacitance-sensing circuit 101 measures a mutual capacitance of an intersection between a transmit (TX) electrode and a receive (RX) electrode of the capacitive-sense array 125. The capacitive-sense array 125 may be various types of touch-sensing devices.

In a further embodiment, the capacitance-sensing circuit 101 includes a TX signal generator to generate a TX signal to be applied to the TX electrode and a receiver (also referred to as a sensing channel), such as an integrator, coupled to measure an RX signal on the RX electrode. In a further embodiment, the capacitance-sensing circuit includes an analog-to-digital converter (ADC) coupled to an output of the receiver to convert the measured RX signal to a digital value (capacitance values). The digital value can be further processed by the processing device 110, the host 150 or both. The non-uniform electrodes 120 can include electrodes disposed in various configurations illustrated and described below with respect to FIGS. 3A-8.

The processing device 110 is configured to detect one or more touches on a touch-sensing device, such as the capacitive-sense array 125. The processing device can detect conductive objects, such as touch objects 140 (fingers or passive styluses, an active stylus 130, or any combination thereof). The capacitance-sensing circuit 101 can measure touch data on the capacitive-sense array 125. The touch data may be represented as multiple cells, each cell representing an isolated sense element or an intersection of sense elements (e.g., electrodes) of the capacitive-sense array 125. In another embodiment, the touch data measured by the capacitance-sensing circuit 101 can be processed by the processing device 110 to generate a 2D capacitive image of the capacitive-sense array 125. In one embodiment, when the capacitance-sensing circuit 101 measures mutual capacitance of the touch-sensing device (e.g., capacitive-sense array 125), the capacitance-sensing circuit 101 determines a 2D capacitive image of the touch-sensing object on the touch surface and processes the data for peaks and positional information. In another embodiment, the processing device 110 is a microcontroller that measures a capacitance touch signal data set, and finger detection firmware executing on the microcontroller identifies data set areas that indicate touches, detects and processes peaks, calculates the coordinates, or any combination therefore. The firmware identifies the peaks using the embodiments described herein. The firmware can calculate a precise coordinate for the resulting peaks. In one embodiment, the firmware can calculate the precise coordinates for the resulting peaks using a centroid algorithm, which calculates a centroid of the touch, the centroid being a center of mass of the touch. The centroid may be an X/Y coordinate of the touch. Alternatively, other coordinate interpolation algorithms may be used to determine the coordinates of the resulting peaks. The microcontroller can report the precise coordinates to a host processor, as well as other information.

Electronic system 100 includes processing device 110, capacitive-sense array 125, stylus 130, host processor 150, embedded controller 160, and non-capacitive sense elements 170. The capacitive sense elements are electrodes of conductive material, such as copper, silver, indium tin oxide (ITO), metal mesh, carbon nanotubes, or the like. The sense elements may also be part of an ITO panel. The capacitive sense elements can be used to allow the capacitive-sensing circuit 101 to measure self-capacitance, mutual capacitance, or any combination thereof. In the depicted embodiment, the electronic system 100 includes the capacitive-sense array 125 coupled to the processing device 110 via bus 122. The capacitive-sense array 125 may include a multi-dimension capacitive-sense array. The multi-dimension sense array includes multiple sense elements, organized as rows and columns. In another embodiment, the capacitive-sense array 125 operates as an all-points-addressable ("APA") mutual capacitive-sense array. In another embodiment, the capacitive-sense array 125 is non-transparent capacitive-sense array (e.g., PC touchpad). The capacitive-sense array 125 may be disposed to have a flat surface profile. Alternatively, the capacitive-sense array 125 may have non-flat surface profiles. Alternatively, other configurations of capacitive-sense arrays may be used. For example, instead of vertical columns and horizontal rows, the capacitive-sense array 125 may have a hexagon arrangement, or the like, as would be appreciated by one of ordinary skill in the art having the benefit of this disclosure. In one embodiment, the capacitive-sense array 125 may be included in an ITO panel or a touch screen panel.

The operations and configurations of the processing device 110 and the capacitive-sense array 125 for detecting and tracking the touch object 140 and stylus 130 are described herein. In short, the processing device 110 is configurable to detect a presence of the touch object 140, a presence of a stylus 130 on the capacitive-sense array 125, or any combination thereof. The processing device 110 may detect and track the stylus 130 and the touch object 140 individually on the capacitive-sense array 125. In one embodiment, the processing device 110 can detect and track both the stylus 130 and touch object 140 concurrently on the capacitive-sense array 125. If the touching object is an active stylus, in one embodiment, the active stylus 130 is configurable to operate as the timing "master," and the processing device 110 adjusts the timing of the capacitive-sense array 125 to match that of the active stylus 130 when the active stylus 130 is in use. In one embodiment, the capacitive-sense array 125 capacitively couples with the active stylus 130, as opposed to conventional inductive stylus applications. It should also be noted that the same assembly used for the capacitive-sense array 125, which is configurable to detect touch objects 140, is also used to detect and track a stylus 130 without an additional PCB layer for inductively tracking the active stylus 130.

In the depicted embodiment, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). The digital block array may be configurable to implement a variety of digital logic circuits (e.g., DACs, digital filters, or digital control systems) using, in one embodiment, configurable user modules ("UMs"). The digital block array may be coupled to a system bus. Processing device 110 may also include memory, such as random access memory ("RAM") 105 and program flash 104. RAM 105 may be static RAM ("SRAM"), and program flash 104 may be a non-volatile storage, which may be used to store firmware (e.g., control algorithms executable by processing core 102 to implement operations described herein). Processing device 110 may also include a memory controller unit ("MCU") 103 coupled to memory and the processing core 102. The processing core 102 is a processing element configured to execute instructions or perform operations. The processing device 110 may include other processing elements as would be appreciated by one of ordinary skill in the art having the benefit of this disclosure. It should also be noted that the memory may be internal to the processing device or external to it. In the case of the memory being internal, the memory may be coupled to a processing element, such as the processing core 102. In the case of the memory being external to the processing device, the processing device is coupled to the other device in which the memory resides as would be appreciated by one of ordinary skill in the art having the benefit of this disclosure.

The processing device 110 may also include an analog block array (not shown, e.g., field programmable analog array). The analog block array is also coupled to the system bus. Analog block array may also be configurable to implement a variety of analog circuits (e.g., ADCs or analog filters) using, in one embodiment, configurable UMs. The analog block array may also be coupled to the GPIO 107.

As illustrated, capacitance-sensing circuit 101 may be integrated into processing device 110. Capacitance-sensing circuit 101 may include analog I/O for coupling to an external component, such as touch-sensor pad (not shown), capacitive-sense array 125, touch-sensor slider (not shown), touch-sensor buttons (not shown), and/or other devices. The capacitance-sensing circuit 101 may be configurable to measure capacitance using mutual-capacitance sensing techniques, self-capacitance sensing technique, charge coupling techniques or the like. In one embodiment, capacitance-sensing circuit 101 operates using a charge accumulation circuit, a capacitance modulation circuit, or other capacitance sensing methods known by those skilled in the art. In an embodiment, the capacitance-sensing circuit 101 is of the Cypress TMA-3xx, TMA-4xx, or TMA-xx families of touch screen controllers. Alternatively, other capacitance-sensing circuits may be used. The mutual capacitive-sense arrays, or touch screens, as described herein, may include a transparent, conductive sense array disposed on, in, or under either a visual display itself (e.g. LCD monitor), or a transparent substrate in front of the display. In an embodiment, the TX and RX electrodes are configured in rows and columns, respectively. It should be noted that the rows and columns of electrodes can be configured as TX or RX electrodes by the capacitance-sensing circuit 101 in any chosen combination. In one embodiment, the TX and RX electrodes of the sense array 125 are configurable to operate as a TX and RX electrodes of a mutual capacitive-sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive-sense array, instead of measuring a mutual capacitance at an intersection of a RX electrode and a TX electrode (a sense element) as done during mutual-capacitance sensing. An intersection between two sense elements may be understood as a location at which one sense electrode crosses over or overlaps another, while maintaining galvanic isolation from each other. The capacitance associated with the intersection between a TX electrode and an RX electrode can be sensed by selecting every available combination of TX electrode and RX electrode. When a touch object, such as a finger or stylus, approaches the capacitive-sense array 125, the object causes a decrease in mutual capacitance between some of the TX/RX electrodes. In another embodiment, the presence of a finger increases the capacitance of the electrodes to the environment (earth) ground, typically referred to as self-capacitance change. Utilizing the change in mutual capacitance, the location of the finger on the capacitive-sense array 125 can be determined by identifying the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more touch objects can be determined. It should be noted that the process can calibrate the sense elements (intersections of RX and TX electrodes) by determining baselines for the sense elements. It should also be noted that interpolation may be used to detect finger position at better resolutions than the row/column pitch as would be appreciated by one of ordinary skill in the art having the benefit of this disclosure. In addition, various types of coordinate interpolation algorithms may be used to detect the center of the touch as would be appreciated by one of ordinary skill in the art having the benefit of this disclosure.

The capacitance-sensing circuit 101 includes the non-uniform electrodes 120. Additional details of the non-uniform electrodes 120 are described below with respect to FIGS. 3-10.

In an embodiment, the electronic system 100 may also include non-capacitive sense elements 170 coupled to the processing device 110 via bus 171 and GPIO port 107. The non-capacitive sense elements 170 may include buttons, light emitting diodes ("LEDs"), and other user interface devices, such as a mouse, a keyboard, or other functional keys that do not use capacitance sensing. In one embodiment, buses 122, and 171 are embodied in a single bus. Alternatively, these buses may be configured into any combination of one or more separate buses.

Processing device 110 may include internal oscillator/clocks 106 and communication block ("COM") 108. In another embodiment, the processing device 110 includes a spread-spectrum clock (not shown). The oscillator/clocks block 106 provides clock signals to one or more of the components of processing device 110. Communication block 108 may be used to communicate with an external component, such as a host processor 150, via host interface ("I/F") line 151. Alternatively, processing device 110 may also be coupled to embedded controller 160 to communicate with the external components, such as host processor 150. In one embodiment, the processing device 110 is configurable to communicate with the embedded controller 160 or the host processor 150 to send and/or receive data.

Processing device 110 may reside on a common carrier substrate such as, for example, an integrated circuit ("IC") die substrate, a multi-chip module substrate, or the like. Alternatively, the components of processing device 110 may be one or more separate integrated circuits and/or discrete components. In one exemplary embodiment, processing device 110 is the Programmable System on a Chip (PSoC®) processing device, developed by Cypress Semiconductor Corporation, San Jose, Calif. Alternatively, processing device 110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 110 may also be done in the host.

Capacitance-sensing circuit 101 may be integrated into the IC of the processing device 110, or alternatively, in a separate IC. Alternatively, descriptions of capacitance-sensing circuit 101 may be generated and compiled for incorporation into other integrated circuits. For example, behavioral level code describing the capacitance-sensing circuit 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe capacitance-sensing circuit 101.

It should be noted that the components of electronic system 100 may include all the components described above. Alternatively, electronic system 100 may include some of the components described above.

In one embodiment, the electronic system 100 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, global position system ("GPS") or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors or other types of capacitance-sensing circuitry. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition, and numeric keypad operation.

Figure 2A:
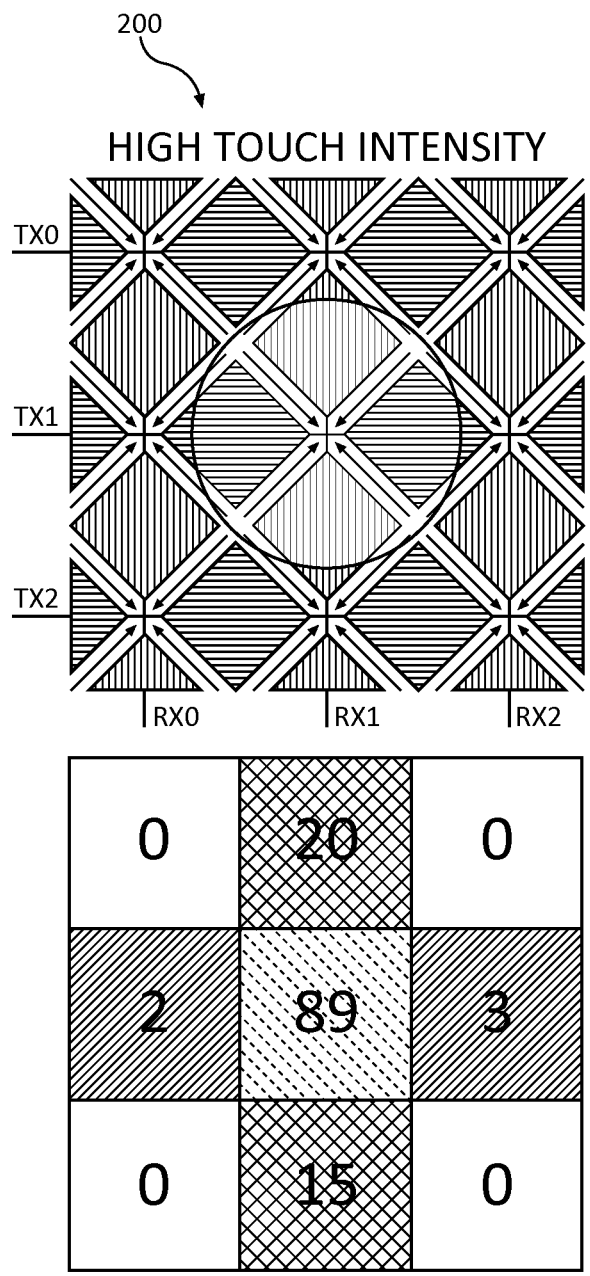
FIG. 2A illustrates a touch with high touch intensity according to one implementation.
Figure 2B:
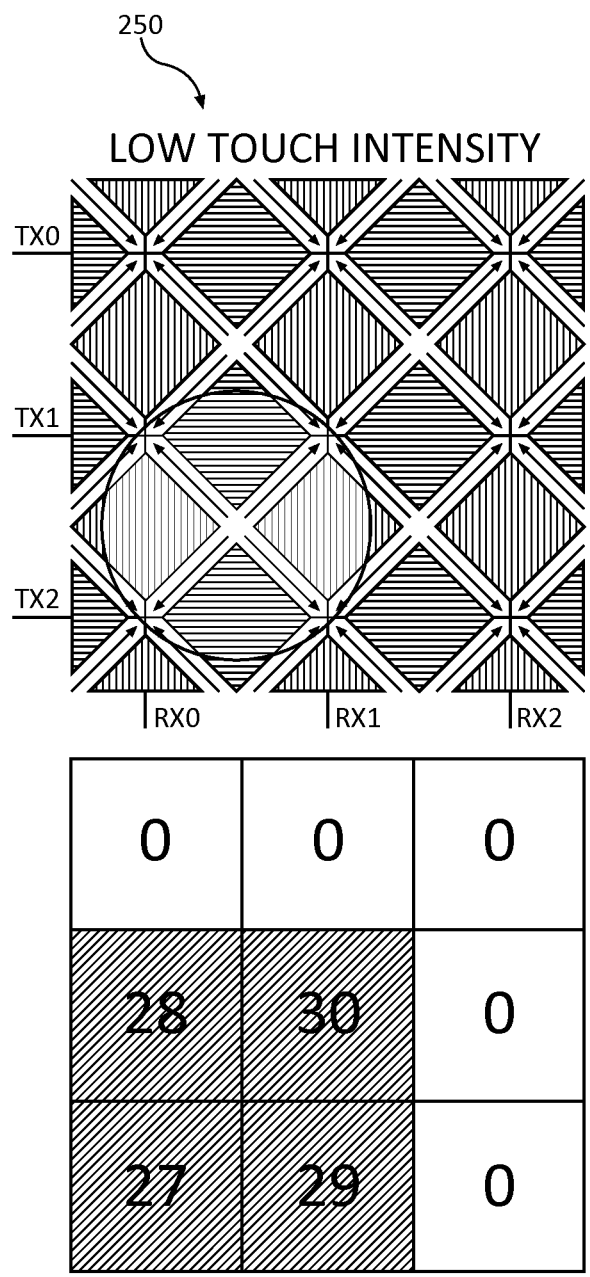
FIG. 2B illustrates a touch with low touch intensity according to one implementation.

The embodiments described herein are directed to patterns of electrodes that create close to uniform maximum signal distributions, regardless of a location of the touch object relative to the capacitive-sense array. Typical sense arrays have very high signal directly over a single unit cell and much lower signal between unit cells. Thus, current touch screen patterns have regions of limited sensitivity. These regions occur in the areas between electrode intersections. To conserve I/O, a typical touch screen pitch for a unit cell is approximately 5 mm. Large pitches generally imply that at some point within the operation of the touch screen, a touch object will not fully cover any one unit cell. In fact, there are two extreme cases for measure capacitance on a touch screen; either the touch object is directly over an intersection (maximum signal), or the touch objects in between four intersections (minimum signal). FIGS. 2A-2B provides a graphical representation of this issue.

FIG. 2A illustrates a touch with high touch intensity according to one implementation. A touch directly over a TX/RX intersection yields 100% signal on the single intersection, which is referred to as a High Touch Intensity (HTI) position 200. A touch in between one TX electrode and two RX electrodes yields 50% of the HTI signal on each of the two intersections. FIG. 2B illustrates a touch with low touch intensity according to one implementation. A touch in between two TX electrodes and two RX electrodes yields 25%-35% of the HTI signal on each of the four intersections, which is called the Least Touch Intensity (LTI) position 250.

Touch detection works by checking the absolute maximum observed signal against a known touch threshold. The difficulty of this approach is that the absolute maximum signal level of a distributed touch can be as low as 30% of the single unit cell signal. This wide range of signal creates false touches and dropped touches, depending on where the finger threshold is tuned. Every new project must overcome this hurdle, which results in less robust designs.

So, the same touch input will yield a wide variety of signal on a per intersection basis. Standard touch detection techniques use a peak detection scheme, which is based on the signal level for a single intersection being over a touch threshold. The high variability of the signal profile makes these thresholds unreliable when also considering a wide variation of touch inputs. In other words, the threshold may be set too high for small touches in the LTI position and may create multiple false touches for a large touch in the HTI position. The reason for this type of signal distribution is the symmetric nature of standard touch screen patterns.

One approach uses firmware to handle the thresholding issue described above. One firmware approach is to perform two thresholds. The first threshold tests if the signal is at least above the LIT case. A second threshold uses a 3×3 or greater summation to ensure that the total value of the surrounding counts is also above a threshold. This summing technique works for a small range of touch inputs. However, when considering small touch types such as a passive stylus or even small fingers (5 mm), the 3×3 summation may still fail and produce dropped touches or be tuned so low that once again false touches are detected.

The embodiments described herein are directed to non-uniform or asymmetrical patterns that have non-uniform electrodes to create a more symmetrical signal distribution between the HTI and LTI touch positions. The non-uniform patterns may be used to minimize an already high signal level at the center of an intersection and maximize a low signal in the regions between intersections. The goal of these non-uniform patterns is to minimize the signal gap between the Least Touch Intensity (LTI) and High Touch Intensity (HTI) touch positions. Minimizing the gap can alleviate the burden for tuning a finger threshold that simultaneously prevents dropped touches and false touches, which are opposing factors for the single threshold level.

Figure 3:
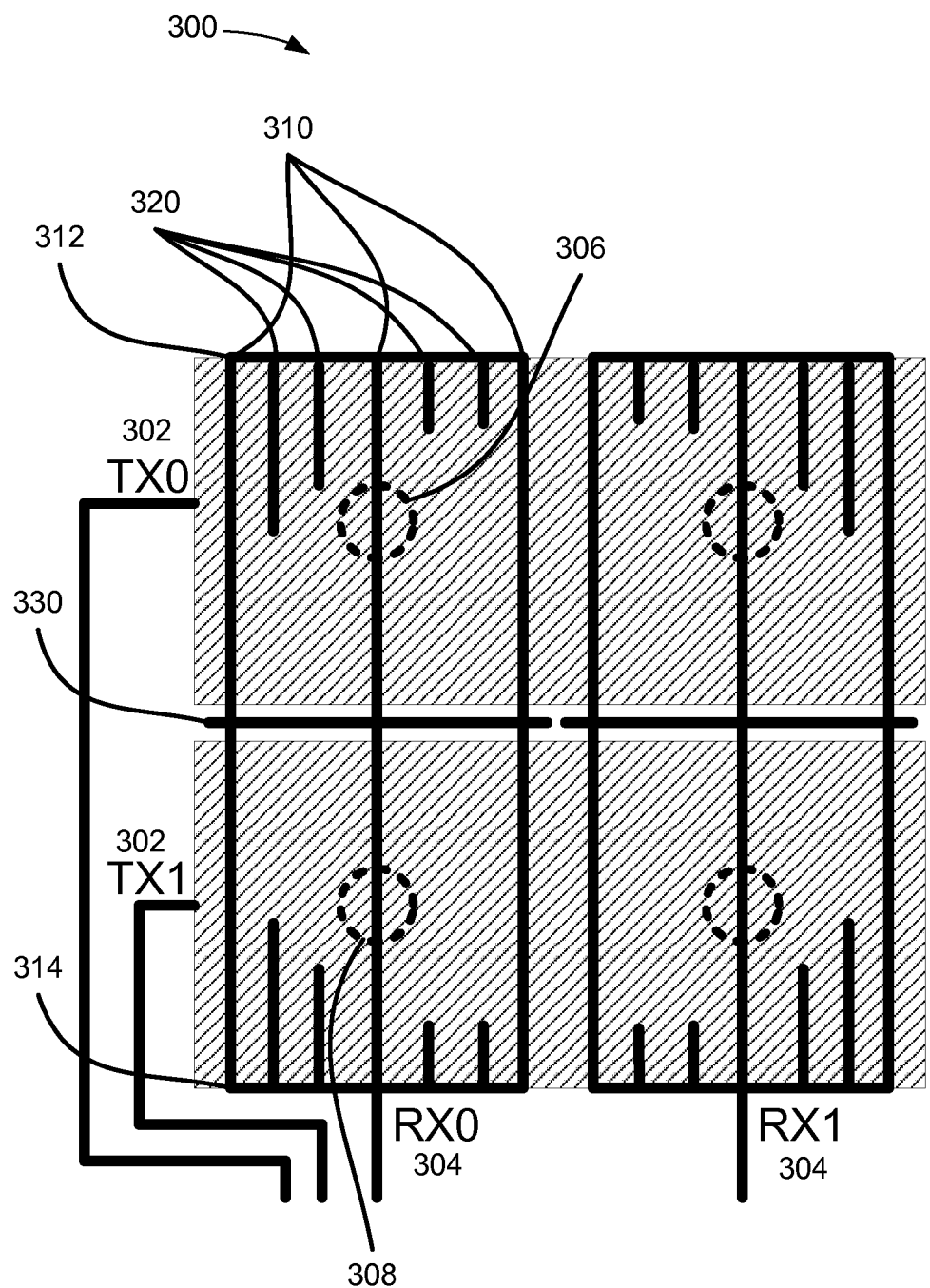
FIG. 3 illustrates a capacitive-sense array with a non-uniform pattern according to one embodiment.

The basis of the solutions described herein it to create non-uniform touch patterns to create uniform signal distribution independent of finger location. This may be done by creating higher signal weights in the regions between electrodes to increase the signal when a touch is in these locations. This concept can be applied for either single-layer or dual-layer patterns. A dual-layer pattern of bars and stripes is the easiest to visualize, as illustrated in FIG. 3. It should be noted that the following embodiments illustrate 2×2 sense arrays, but other sizes of sense arrays can be used.

FIG. 3 illustrates a capacitive-sense array 300 with a non-uniform pattern according to one embodiment. The capacitive-sense array 300 includes two row electrodes 302 (also referred to as TX electrodes) that are solid bars and two column electrodes 304 (also referred to as RX electrodes) that include three stripes per electrode. The TX electrodes 302 have a uniform conductive pattern, where the uniform pattern has a solid rectangular bar shape. The RX electrodes 304 have a non-uniform conductive pattern. The non-uniform pattern includes a first set of parallel lines 310 coupled by a first end line 312 at a first end and by a second end line 314 at a second end. One of the first set of parallel lines 310 passes through first regions where the intersections are located. For example, a first stripe in a center of a first RX electrode 304 and two stripes at edges of the first RX electrode 304. The first stripe passes through a first intersection 306 with the first TX electrode 302 and through a second intersection 308 with the second TX electrode 302. The non-uniform pattern also includes a second set of one or more additional line segments 320 disposed in a distal region of a unit cell with the first intersection 306. The second set of one or more additional line segments 320 can also be disposed in distal regions of other unit cells, such as the other unit cell with the second intersection 308. The second set of one or more additional line segments 320 do not pass through the first region. In this embodiment, the second set of additional line segments are parallel lines segments that are substantially parallel to the first set of parallel lines 310. Alternatively, the one or more additional lines can be other patterns than parallel lines. Also, in this embodiment, the parallel lines 320 are different lengths and taper in length towards the intersection 306 in a first axis. That is the parallel lines 320 to the left of the intersection 306 are decreasing in length from left to right towards the intersection 306 and the parallel lines 320 to the right of the intersection 306 are decreasing in length from right to left towards the intersection 306. In one embodiment, the segments 320 increase in length as their distances from the intersection increase. The second set of additional line segments 320 increases a conductive surface area in the distal regions that are farther away from the first regions where the intersections of the unit cells are located.

In a further embodiment, as depicted in FIG. 3, the non-uniform pattern also includes a line segment 330 that is substantially parallel to the first end line 312 at the first end and/or the second end line 314 at the second end. The line segment 330 is disposed to connect the first set of parallel lines 310 at another location than the first end. In this embodiment, the line segment 330 is disposed between the two TX electrodes 302.

Figure 4:
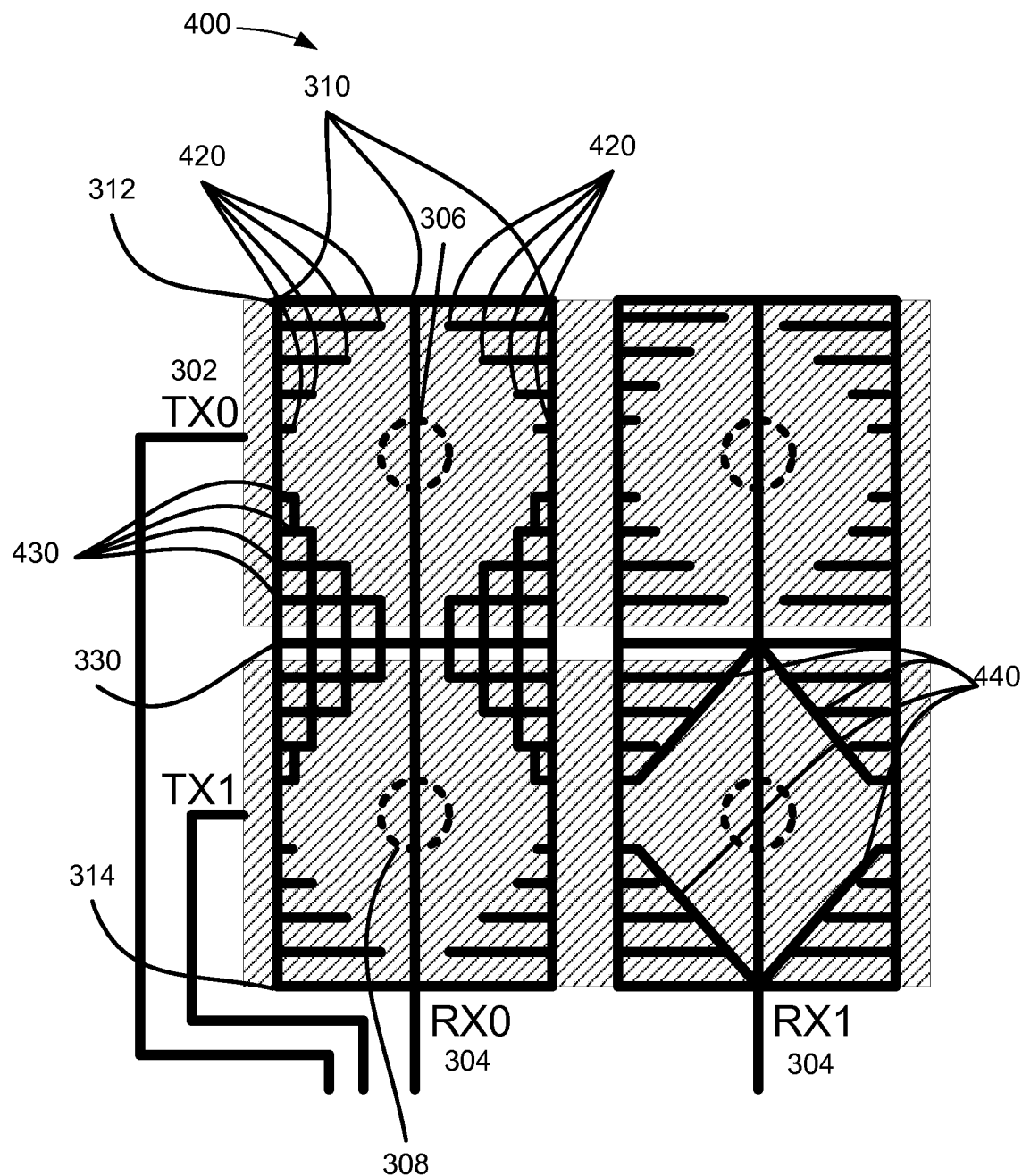
FIG. 4 illustrates a capacitive-sense array with a non-uniform pattern according to another embodiment.

In another embodiment, the second set of one or more additional line segments 320 include a diagonal line disposed to connect tapering ends of the parallel line segments 320, such as illustrated with lines 440 in FIG. 4.

Various features can be added to the electrodes other than parallel line segments 320, line segments 330. For example, FIG. 4 illustrates various other features that can be used to create non-uniform electrodes to create non-uniformity in the unit cells. Some or all of these features would be used depending on system parameters. The more signal added in the LTI region, the higher mutual capacitance (Cm) will grow. At some point, the increase in Cm may negate any further benefits from this type of approach. Some features can be used to create a higher linear overlap of the touch region between intersections (illustrated as dashed lines in FIG. 3). In some embodiments, a uniform signal distribution can be achieved from the non-uniform pattern. In one embodiment, a unit cell includes an intersection between a first electrode and a second electrode and the unit cell is adjacent to other unit cells with corresponding intersections. The non-uniform pattern has a higher linear overlap in the regions region between the intersections of adjacent unit cells to maximize a touch signal in the regions between the unit cells. In general, near the edges of the unit cells additional signal can be generated by adding extra lines, connecting segments, or the like. These higher signals can compensate for touches between the intersections to provide more uniform signal distributions for touches, as described herein. These types of sensor patterns can create a close to uniform signal distribution at very little expense. The issues resulting from dropped touches or limited range of expected inputs (e.g., no passive stylus allowed) can be reduced by using asymmetrical patterns such as these. Signal levels at a similar level between the LTI and HTI positions permit more robust thresholding schemes. A better, more reliable, tresholding scheme can improve the detection rate of touch inputs and reduce the occurrences of false detections. These types of patterns can ultimately improve the customer experience when using a touchscreen or other touch surfaces. The embodiments described herein can be used as part of a touchscreen system.

In particular, these patterns represents the conductive patterning of a touch screen sense array, typically part of an ITO layer deposited on a substrate like film or glass. These patterns allow signals to spread more evenly into neighboring intersections when touches are placed in between multiple touch intersections. The benefit of this is an increase in touch detection reliability because of the nature of the peak detection routine. The asymmetrical alignment of the electrodes (referred to herein as non-uniform electrodes can be allocated in the TX plane, the RX plane or both.

FIG. 4 illustrates a capacitive-sense array 400 with a non-uniform pattern according to another embodiment. The capacitive-sense array 400 is similar to the capacitive-sense array 300 as noted by similar reference numbers, however, the capacitive-sense array 400 includes different features to increase the conductive surface areas in the distal regions away from the intersections. Instead of parallel lines 320 that are parallel to the first set of parallel lines 310, the capacitive-sense array 400 includes a second subset of parallel line segments 420 that are substantially orthogonal to the first set of parallel lines 310. The second subset of parallel line segments 420 are different lengths and taper in length towards the intersection in a second axis.

In another embodiment, the second set of line segments include the second subset of parallel line segments 420 that are orthogonal and a third subset of parallel line segments like line segments 320 of FIG. 3 to form wire boxes 430. In a further embodiment, the second set of one or more additional line segments further include lines 440 disposed to connect tapering ends of the parallel line segments 420.

It should be noted that various features are illustrated in FIG. 4, but in some embodiments one of each of these features could be utilized to create non-uniform electrodes as described herein.

Figure 5:
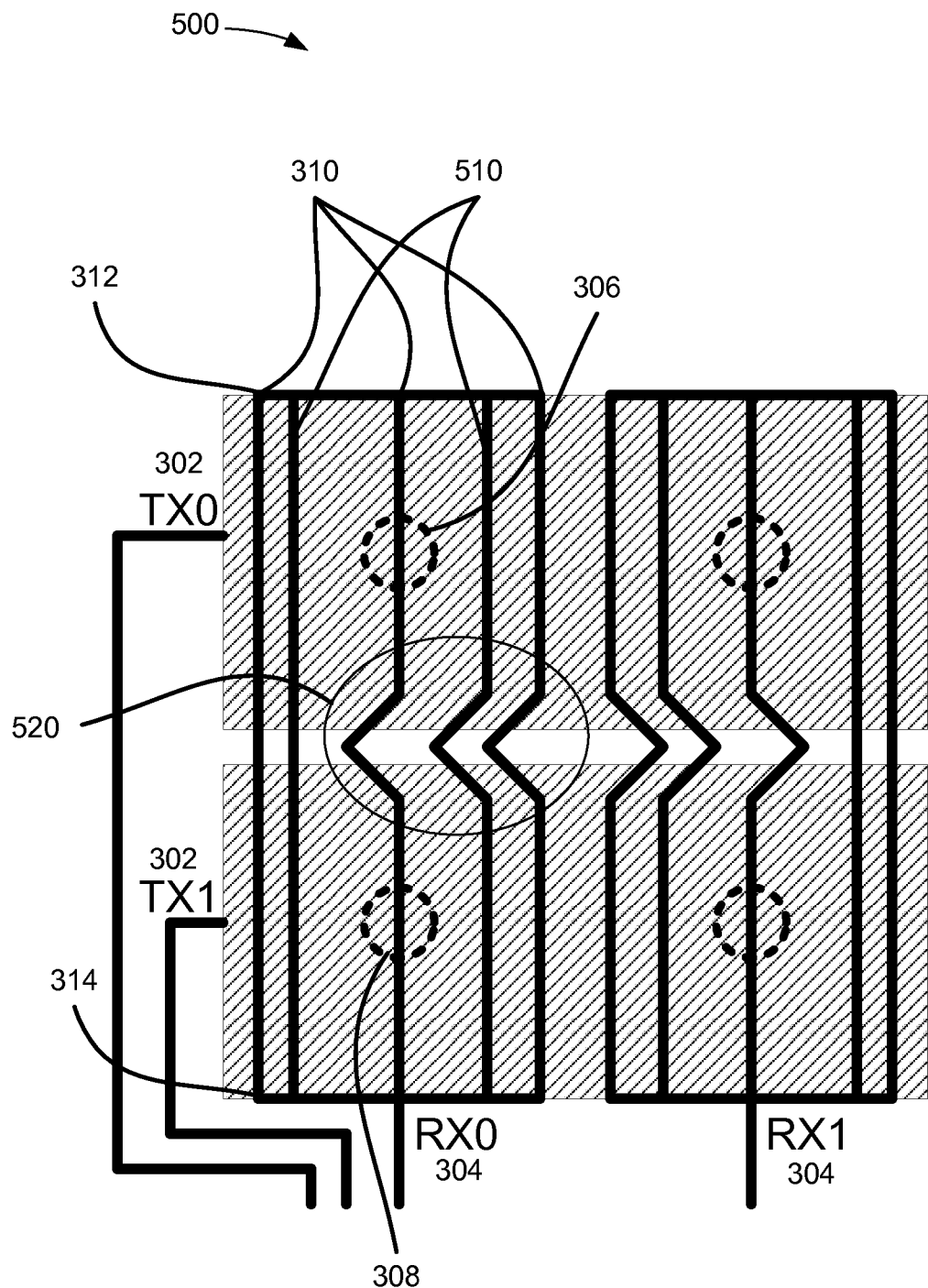
FIG. 5 illustrates a capacitive-sense array with a non-uniform pattern according to another embodiment.

FIG. 5 illustrates a capacitive-sense array 500 with a non-uniform pattern according to another embodiment. The capacitive-sense array 500 is similar to the capacitive-sense array 300 as noted by similar reference numbers, however, the capacitive-sense array 500 includes different features to increase the conductive surface areas in the distal regions away from the intersections. The capacitive-sense array 500 includes the first parallel line 310 that passes through the first region with the intersection 306 (and 308) in a first axis and three or more lines disposed in the distal region. The three or more lines being parallel to the first line in the first axis, where the three or more lines do not pass through the first region. In the depicted embodiment, two more parallel lines 510 are disposed near the two other parallel lines 310 that are disposed at the edge of the electrode 304. In one embodiment, a first parallel line 510 is disposed at a first distance from the left parallel line 310 and a second parallel line 510 is disposed at a second distance from the right parallel line 310. The first and second distances may be the same distance or different distances.

In a further embodiment, two or more of the first line 310 and three or more lines include angled line segments 520 disposed in the distal region(s) between the intersections 306 and 308. The angled line segments 520 can create a higher linear overlap of the distal region between intersections. In this embodiment, the center line 310, the second parallel line 510 and the second parallel line 310 include angled line segments 520. In another embodiment, different combinations of the parallel lines can have the angled line segments 520.

Figure 6:
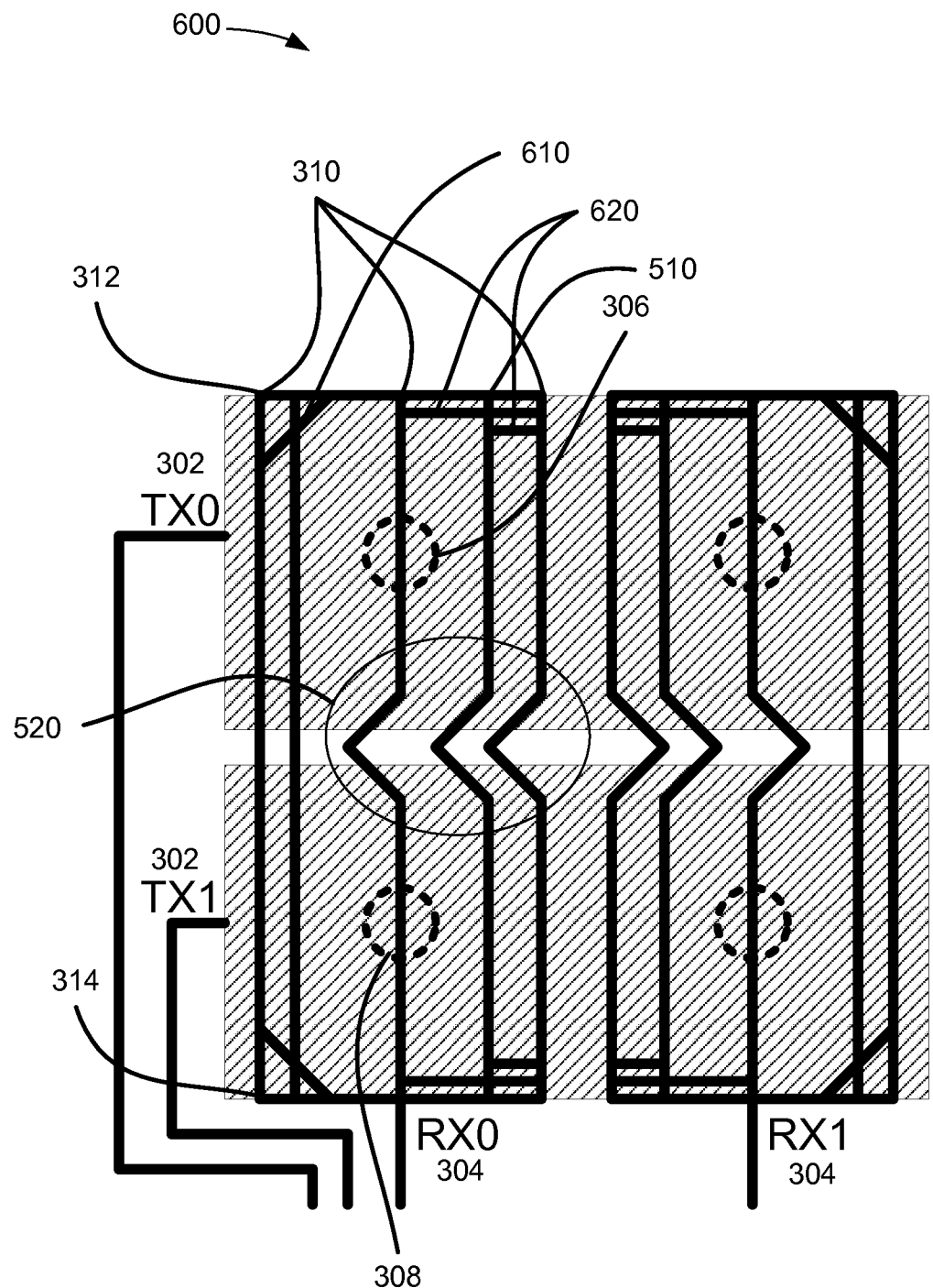
FIG. 6 illustrates a capacitive-sense array with a non-uniform pattern according to another embodiment.

FIG. 6 illustrates a capacitive-sense array 600 with a non-uniform pattern according to another embodiment. The capacitive-sense array 600 is similar to the capacitive-sense array 500 as noted by similar reference numbers, however, the capacitive-sense array 600 includes different features to increase the conductive surface areas in the distal regions away from the intersections. The capacitive-sense array 600 includes a diagonal line 610 and parallel lines 620. The diagonal line 610 is disposed at a corner of the unit cell and is coupled between the first end line 312 and the left parallel line 310 (also referred to as an edge line). Similar diagonal lines at the other unit cells can also be used. The parallel lines 620 can be disposed at another corner of the unit cell. The parallel lines are substantially orthogonal to the parallel lines 310. In this embodiment, a first parallel line 620 is coupled between the center line 310 and the left line 310 and a second parallel line 620 is coupled between the second parallel line 510 and the left line 310.

Creating a pattern which has less sensitivity at the center of an intersection and more sensitivity at its edges is easy to understand using a dual-layer bars and stripes pattern, as illustrated in FIGS. 3-6. FIGS. 3-6 show a couple of different features of patterns that emphasize signal at the edges and corners of the units cells and de-emphasize signal at the center of the intersections. Of course, one or more of these features could be used in practice to create a uniform signal distribution. In these embodiments, there is a high density of RX electrodes near intersection borders and a lower density at the centers of the unit cells (marked as hashed-line circles).

Figure 7:
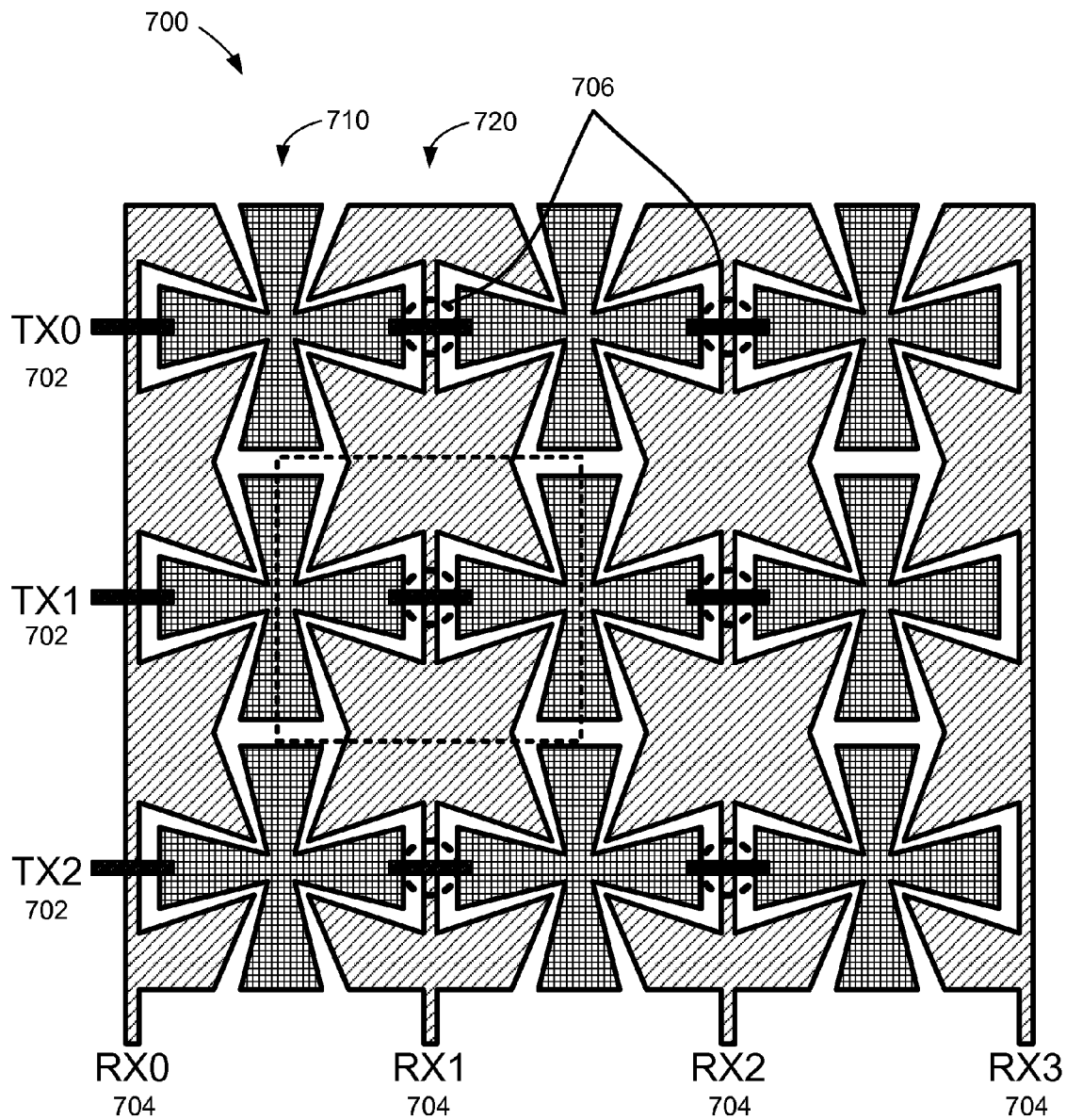
FIG. 7 illustrates a capacitive-sense array with a non-uniform pattern according to another embodiment.

The embodiments of FIGS. 3-6 are dual-layer patterns in which the TX electrodes 302 are disposed in a first layer and the RX electrode 304 can be disposed in a second layer. Customers and ITO processes sometimes dictate the use of a single-layer pattern instead of a two layer pattern. A single-layer pattern approach can also be achieved using the same idea of low sensitivity directly over an intersection and higher sensitivity at the edges of the intersection. FIG. 7 shows an example of a single-layer pattern.

FIG. 7 illustrates a capacitive-sense array 700 with a non-uniform pattern according to another embodiment. The capacitive-sense array 700 includes a first set of electrodes, TX electrodes 702, and a second set of electrodes, RX electrodes 704. The TX electrodes 702 and the RX electrodes 704 are disposed on a single layer. In this embodiment, both sets of electrodes can be used to form the non-uniform conductive pattern. The non-uniform pattern includes tessellated cross shapes 710 disposed along a first axis. Each of the tessellated cross shapes 710 includes four segments that taper in width towards a center of the four segments. The non-uniform pattern also includes tessellated star shapes 720 disposed along a second axis and disposed to interlock with the tessellated cross shapes 710. Each of the tessellated star shapes 720 include four additional segments that taper in width away from a center of the four additional segments. In this embodiment, the tessellated cross shapes 710 are coupled together with bridges or jumpers (illustrated as black rectangles). Alternatively, the tessellated star shapes 720 could be coupled together with bridges or jumpers, instead of the tessellated cross shapes 710.

Note that the points of the four-pronged polygons of the tessellated star shape 720 point towards the distal regions in between intersections 706, because the centers of the intersections 706 are where the bridges cross the routing channels. These points will have more signal distribution than at region within the four-pronged polygons (center of the unit cell). Therefore, this one layer pattern should produce even signal distribution.

Similar to a relationship between a single solid diamond (SSD) patterns and dual solid diamonds (DSD) patterns, the single-layer pattern of capacitive-sense array 700 could be shrunk by 25% and used to create a higher density pattern. The relative geometry of the micro cells within this pattern would not change. A DSD style approach to FIG. 7 could produce an even greater benefit than a SSD approach. The pattern of the capacitive-sense array 700 can be used to produce a close to uniform signal regardless of touch location.

Figure 8:
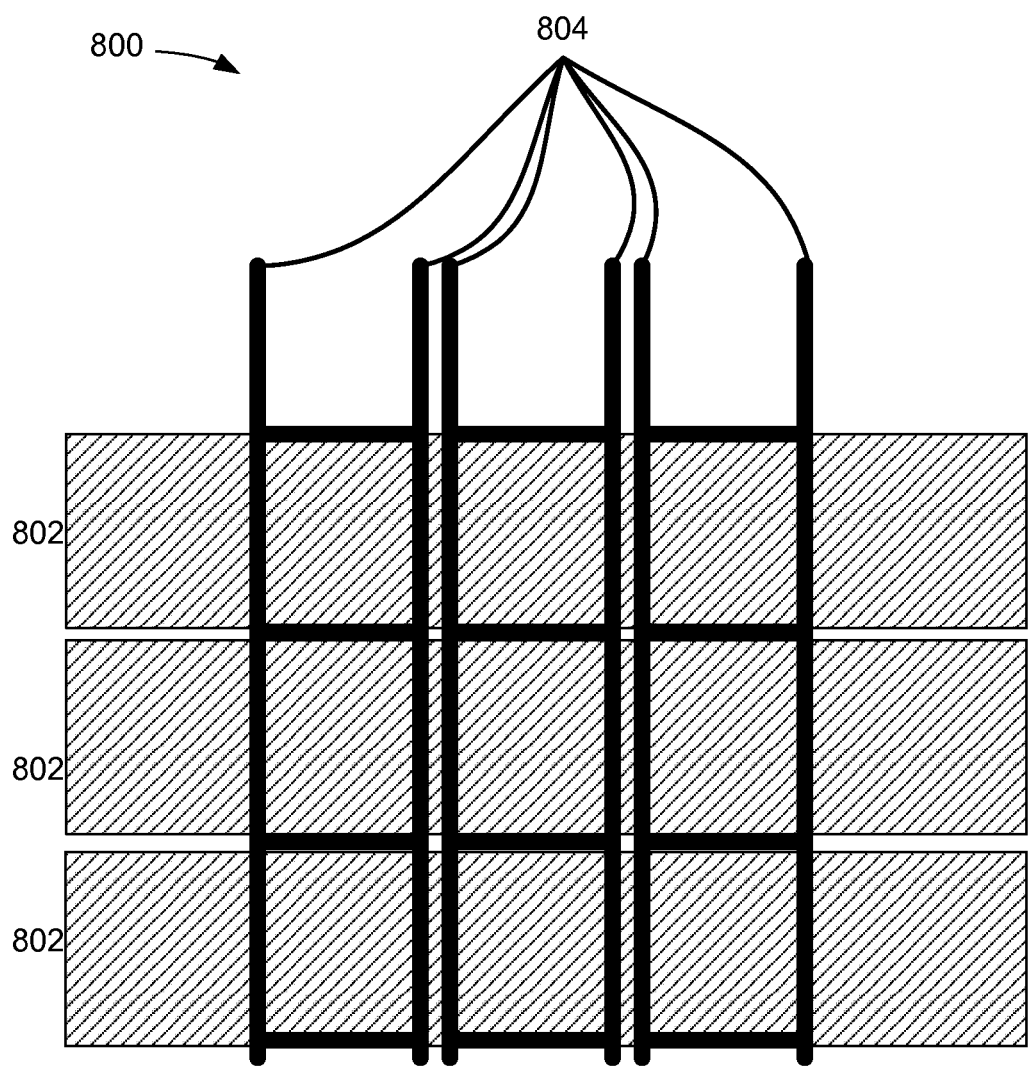
FIG. 8 illustrates a capacitive-sense array with a non-uniform pattern according to another embodiment.

FIG. 8 illustrates a capacitive-sense array 800 with a non-uniform pattern according to another embodiment. The capacitive-sense array 800 is a simplified approach in which horizontal TX electrodes 802 are solid bars and the RX electrodes 804 are vertical lines that are horizontally connected with horizontal lines 806. The horizontal lines 806 are disposed between the horizontal TX electrodes 802. In this embodiment, a touch signal is maximized in the regions between unit cells.

The capacitive-sense array patterns, as described herein, can be modified to fit specific customer requirements. FIG. 6 shows a good example of a pattern that can trade off sensitivity for panel resistance-capacitive (RC) time constant. Higher coupling between the TX/RX electrodes means the parasitic capacitance of the electrodes will be higher and therefore the maximum TX drive frequency will be limited.

The embodiments described herein can improve the performance of touch panel signals, which are fed into a touch controller. The algorithms used to find touches on a panel can be more reliable as a result of these types of patterns. Therefore, the user experience of the touch controller will be enhanced because there will be less failures (e.g., false positives/negatives). One of the benefits of the embodiments describe herein is a more uniform signal distribution for touch inputs regardless of the location of the touch. This may provide an advance of having a setup that is more robust for touch detection algorithms. As described herein, conventional system have a wide distribution of peak signal levels versus spatial touch location. Therefore, these wide ranges must be accommodated for with very precise tuning that can be exposed to false or dropped touches in low margin designs. Bringing the two signal domains closer together using the embodiments described herein allow applications to more easily tune the touch controllers and provide more robust designs to customers without affect the accuracy of the touchscreen.

Figures 9A, 9B:
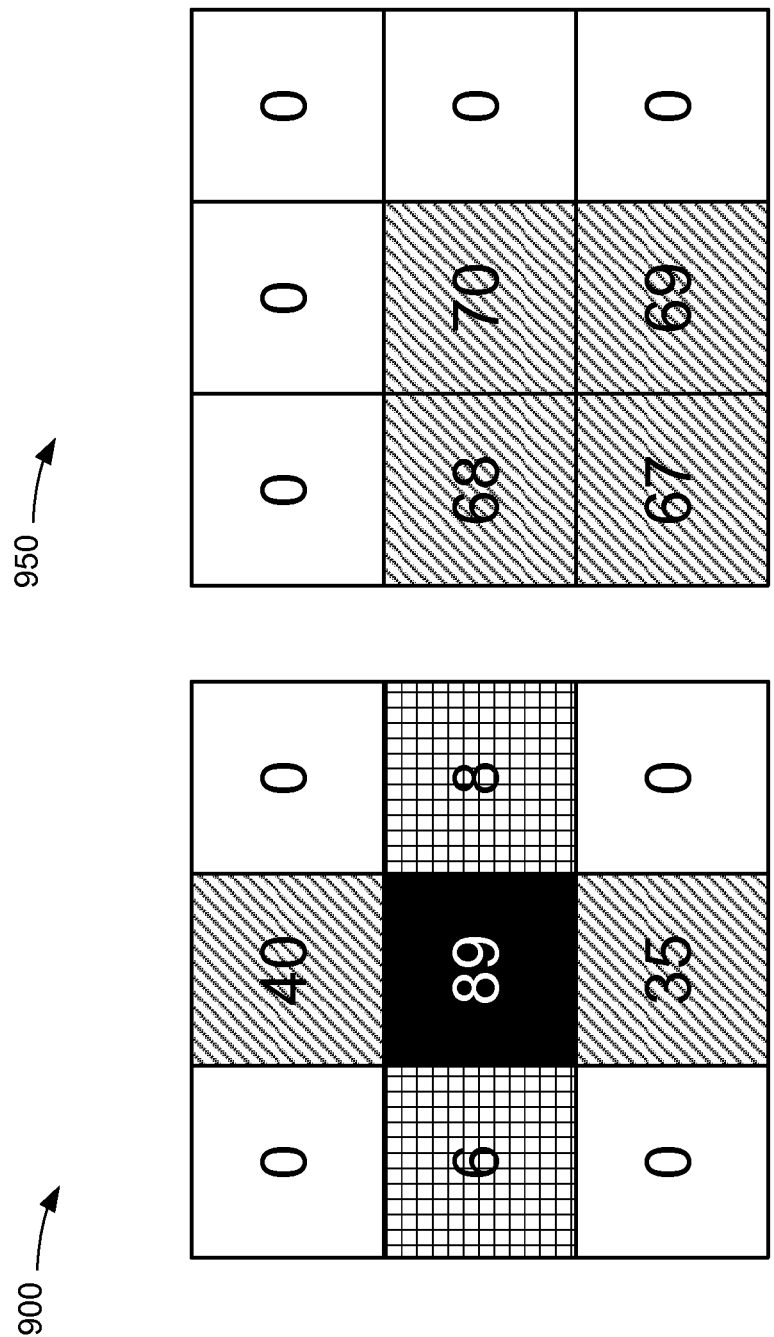
FIG. 9A illustrates a touch over a center of a unit cell according to one embodiment.
FIG. 9B illustrates a touch between unit cells according to one embodiment.

FIG. 9A illustrates a signal distribution 900 of a touch over a center of a unit cell according to one embodiment. FIG. 9B illustrates a signal distribution 950 of a touch between unit cells according to one embodiment. Using the embodiments described herein, the patterns minimize the signal difference between a touch over an intersection, illustrated in FIG. 9A, and a touch in between one or more intersections, illustrated in FIG. 9B. The large gap in signal between these different touch types in conventional systems creates a less robust threshold mechanism for touch detection. By reducing the gap using the embodiments described herein may allow for a more stable set of tuning parameters and may increase the reliability of the touchscreen system. In general, the concept of the embodiments described herein reduces the sensitivity of the pattern within the center of a unit cell and increases the sensitivity at the edges of a unit cell.

Figure 10:
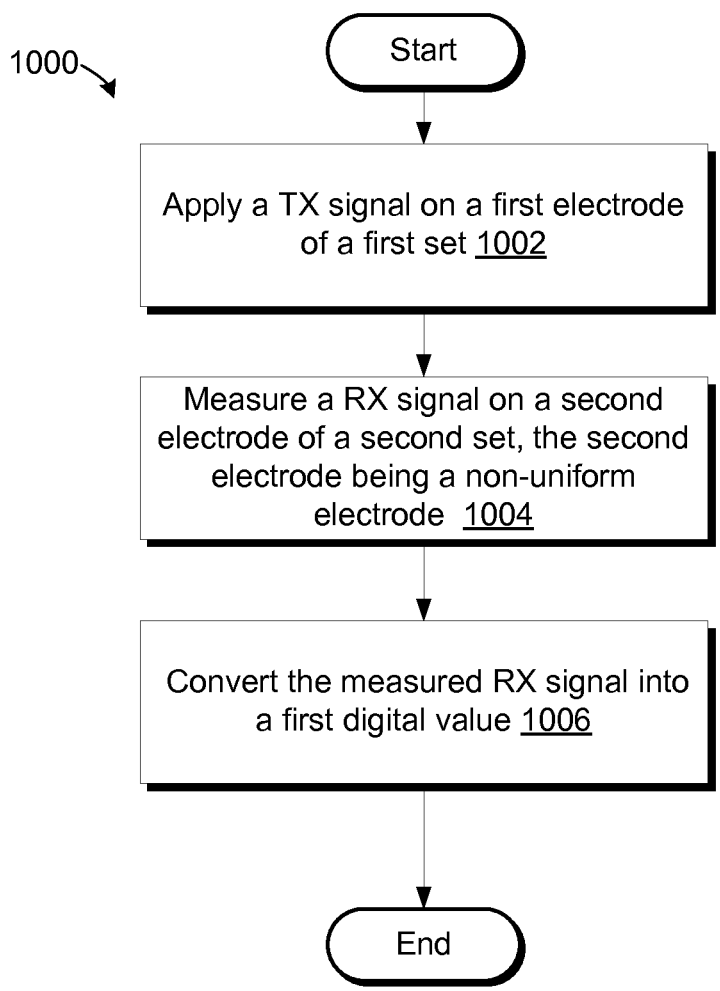
FIG. 10 is a flow diagram of a method of sensing a capacitive-sense array with a non-uniform pattern according to an embodiment.

FIG. 10 is a flow diagram of a method 1000 is a flow diagram of a method of sensing a capacitive-sense array with a non-uniform pattern according to an embodiment. The method 1000 may be performed by processing logic that may include hardware (circuitry, dedicated logic, etc.), software (such as is run on a general purpose computing system or a dedicated machine), firmware (embedded software), or any combination thereof. In one embodiment, the processing device 110 of FIG. 1 performs some or all of method 1000. In another embodiment, the capacitance-sensing circuit 101 of FIG. 1 performs some or all of the operations of method 1000. Alternatively, other components of the electronic system 100 of FIG. 1 perform some or all of the operations of method 1000.

In FIG. 10, method 1000 begins with the processing logic applying a transmit (TX) signal on a first electrode of a first set of electrodes (block 1002). The processing logic measures a receive (RX) signal on a second electrode of a second set of electrodes (block 1004). The first set of electrodes intersect the second set of electrodes to form a unit cells each corresponding to an intersection of a pair of electrodes including one electrode from the first set and one electrode from the second set. The second electrode includes a non-uniform conductive pattern including a first region the first region being located at the intersection of the respective unit cell and a distal region the distal region being at a location within the respective unit cell that is farther away from the intersection than the first region. The first region includes a first conductive surface area and the distal region includes a second conductive surface area that is greater than the first conductive surface area. The processing logic converts the measured RX signal into a first digital value (block 1006). The first digital value represents a first capacitance at the intersection between the first electrode and the second electrode.

In a further embodiment, the processing logic measures a second RX signal on a third electrode of the second set of electrodes. The third electrode comprises the non-uniform conductive pattern. The processing logic converts the second RX signal into a second digital value, representing a second capacitance at the intersection between the first electrode and the third electrode. In a further embodiment, the processing logic applies the TX signal on a fourth electrode of the first set of electrodes, measures a third RX signal on the second electrode and converts the third RX signal into a third digital value, wherein the third digital value represents a third capacitance at the intersection between the fourth electrode and the second electrode. The processing logic measures a fourth RX signal on the third electrode and converts the fourth RX signal into a fourth digital value, representing a fourth capacitance at the intersection between the fourth electrode and the third electrode.

The method may also include using other non-uniform electrodes as illustrated and described above with respect to FIGS. 3-9.

In one embodiment, the capacitive touch screen controller is the TrueTouch® capacitive touchscreen controller, such as the CY8CTMA3xx family of TrueTouch® Multi-Touch All-Points touchscreen controllers, developed by Cypress Semiconductor Corporation of San Jose, Calif. The TrueTouch® capacitive touchscreen controllers sensing technology to resolve touch locations of multiple fingers and a stylus on the touch-screens, supports various operating systems, and is optimized for low-power multi-touch gesture and all-point touchscreen functionality. Alternatively, the touch position calculation features may be implemented in other touchscreen controllers, or other touch controllers of touch-sensing devices. In one embodiment, the touch position calculation features may be implemented with other touch filtering algorithms as would be appreciated by one of ordinary skill in the art having the benefit of this disclosure.

The embodiments described herein may be used in sense arrays used in mutual capacitance sensing systems, or in self-capacitance sensing systems, or combinations thereof. In some cases, the sense array is the same array and both self-capacitance methods and/or mutual-capacitance methods can be applied to the same sense array. In one embodiment, the capacitance sensing system detects multiple sense elements that are activated in the array, and can analyze a signal pattern on the neighboring sense elements to separate noise from actual signal. The embodiments described herein are not tied to a particular capacitive sensing solution and can be used as well with other sensing solutions, including optical sensing solutions, as would be appreciated by one of ordinary skill in the art having the benefit of this disclosure.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A capacitive-sense array comprising:
   a first set of electrodes; and
   a second set of electrodes, wherein the first set of electrodes intersect the second set of electrodes to form a plurality of unit cells each corresponding to an intersection of a pair of electrodes comprising one electrode from the first set and one electrode from the second set, and
   wherein at least one of the second set of electrodes comprises a non-uniform conductive pattern, and each unit cell comprises a first region being located at the intersection of the respective unit cell and a distal region being at a location within the respective unit cell that is farther away from the intersection than the first region, wherein the first region comprises a first conductive surface area and the distal region comprises a second conductive surface area that is greater than the first conductive surface area and the second conductive surface area is associated with a different conductive pattern than the first conductive surface area of the first region and the different conductive pattern comprises additional line segments, from the second set of electrodes, that are different lengths that are tapered towards the intersection so that the lengths of the additional line segments decrease as a distance of the additional line segments from the intersection decreases, and wherein the additional line segments are outside of the first region located at the intersection of the respective unit cell, and wherein the second conductive surface area is associated with a higher sensitivity to detect a touch object than the first conductive surface area.

2. The capacitive-sense array of claim 1, wherein at least one of the first set of electrodes comprises a uniform conductive pattern, wherein the uniform pattern has a rectangular bar shape, and wherein the non-uniform pattern comprises:
 a first set of parallel lines coupled by a first end line at a first end of the at least one of the second set of electrodes, wherein at least one of the first set of parallel lines passes through the first region; and
 a second set of one or more additional line segments disposed in the distal region, wherein the second set of one or more additional line segments do not pass through the first region.

3. The capacitive-sense array of claim 2, wherein the second set of one or more additional line segments comprises parallel line segments that are substantially parallel to the first set of parallel lines.

4. The capacitive-sense array of claim 3, wherein the parallel line segments taper in length towards the intersection in a first axis.

5. The capacitive-sense array of claim 4, wherein the second set of one or more additional line segments further comprise a line disposed to connect tapering ends of the parallel line segments.

6. The capacitive-sense array of claim 4, wherein the second set of one or more additional line segments further comprises a line segment that is substantially parallel to the first end line at the first end, wherein the line segment is disposed to connect the first set of parallel lines at another location than the first end.

7. The capacitive-sense array of claim 2, wherein the second set of one or more additional line segments comprises parallel line segments that are substantially orthogonal to the first set of parallel lines.

8. The capacitive-sense array of claim 2, wherein the second set of one or more additional line segments comprises:
 a first subset of parallel line segments that are substantially parallel to the first set of parallel lines, wherein the first subset of parallel line segments are different lengths and taper in length towards the intersection in a first axis; and
 a second subset of parallel line segments that are substantially orthogonal to the first set of parallel lines, wherein the second subset of parallel line segments are different lengths and taper in length towards the intersection in a second axis, and wherein the first subset and the second subset form a plurality of wire boxes.

9. The capacitive-sense array of claim 2, wherein the second set of one or more additional line segments comprises a diagonal line coupled to an edge line of the first set of parallel lines and at least one of the first end line or a second end line at a second end of the at least one of the second set of electrodes.

10. The capacitive-sense array of claim 1, wherein at least one of the first set of electrodes comprises a uniform conductive pattern, wherein the uniform pattern is a rectangular bar shape, and wherein the non-uniform pattern comprises:
 a first line that passes through the first region in a first axis; and
 three or more lines disposed in the distal region, the three or more lines being parallel to the first line in the first axis, wherein the three or more lines do not pass through the first region.

11. The capacitive-sense array of claim 10, wherein two or more of the first line and three or more lines comprise angled line segments disposed in the distal region.

12. The capacitive-sense array of claim 1, wherein at least one of the first set of electrodes comprises a uniform conductive pattern, wherein the uniform pattern has a rectangular bar shape, and wherein the non-uniform pattern comprises:
 a first set of parallel lines disposed in a first axis, wherein the first set of parallel lines are coupled by a first end line at a first end of the at least one of the second set of electrodes, wherein at least one of the first set of parallel lines passes through the first region, and wherein at least two or more of the first set of parallel lines comprise angled line segments disposed in the distal region.

13. The capacitive-sense array of claim 1, wherein the first set of electrodes and the second set of electrodes are disposed on a single layer, wherein at least one of the first set of electrodes comprises a second non-uniform conductive pattern, wherein the second non-uniform pattern comprises tessellated cross shapes disposed along a first axis, each of the tessellated cross shapes comprising four segments that taper in width towards a center of the four segments, and wherein the non-uniform pattern comprises tessellated star shapes disposed along a second axis and disposed to interlock with the tessellated cross shapes, each of the tessellated star shapes comprising four additional segments that taper in width away from a center of the four additional segments.

14. A method comprising:
 applying a transmit (TX) signal on a first electrode of a first set of electrodes;
 measuring a receive (RX) signal on a second electrode of a second set of electrodes, wherein the first set of electrodes intersect the second set of electrodes to form a plurality of unit cells each corresponding to an intersection of a pair of electrodes comprising one electrode from the first set and one electrode from the second set, wherein the second electrode comprises a non-uniform conductive pattern, and each unit cell comprises a first region being located at the intersection of the respective unit cell and a distal region being at a location within the respective unit cell that is farther away from the intersection than the first region, wherein the first region comprises a first conductive surface area and the distal region comprise a second conductive surface area that is greater than the first conductive surface area and the second conductive surface area is associated with a different conductive pattern than the first conductive surface area of the first region and the different conductive pattern comprises additional conductive lines, from the second set of electrodes, that are different lengths that are tapered towards the intersection so that the lengths of the additional conductive lines decrease as a distance of the additional conductive lines from the intersection decreases, and wherein the additional conductive lines are outside of the first region located at the intersection of the respective unit cell, and wherein the second conductive surface area is associated with a higher sensitivity to detect a touch object than the first conductive surface area; and converting the measured RX signal into a first digital value, wherein the first digital value represents a first capacitance at the intersection between the first electrode and the second electrode.

15. The method of claim 14, further comprising:
measuring a second RX signal on a third electrode of the second set of electrodes, wherein the third electrode comprises the non-uniform conductive pattern; and
converting the second RX signal into a second digital value, wherein the second digital value represents a second capacitance at the intersection between the first electrode and the third electrode.

16. The method of claim 15, further comprising:
applying the TX signal on a fourth electrode of the first set of electrodes;
measuring a third RX signal on the second electrode;
converting the third RX signal into a third digital value, wherein the third digital value represents a third capacitance at the intersection between the fourth electrode and the second electrode;
measuring a fourth RX signal on the third electrode; and
converting the fourth RX signal into a fourth digital value, wherein the fourth digital value represents a fourth capacitance at the intersection between the fourth electrode and the third electrode.

17. An apparatus comprising:
a capacitive sense array of a plurality of electrodes, wherein the plurality of electrodes comprises:
a first set of electrodes; and
a second set of electrodes,
wherein the first set of electrodes intersect the second set of electrodes to form a plurality of unit cells each corresponding to an intersection of a pair of electrodes comprising one electrode from the first set and one electrode from the second set,
wherein the second set of electrodes comprises a non-uniform conductive pattern, and each unit cell comprises a first region being located at the intersection of the respective unit cell and a distal region being at a location within the respective unit cell that is farther away from the intersection than the first region, wherein the first region comprises a first conductive surface area and the distal region comprise a second conductive surface area that is greater than the first conductive surface area and the second conductive surface area is associated with a different conductive pattern than the first conductive surface area of the first region and the different conductive pattern comprises additional conductive lines, from the second set of electrodes, that are different lengths that are tapered towards the intersection so that the lengths of the additional conductive lines decrease as a distance of the additional conductive lines from the intersection decreases, and wherein the additional conductive lines are outside of the first region located at the intersection of the respective unit cell, and wherein the second conductive surface area is associated with a higher sensitivity to detect a touch object than the first conductive surface area; and
a processing device coupled to the capacitive sense array, wherein the processing device is configured to measure signals from the capacitive sense array to determine capacitance values for the plurality of unit cells.

18. The apparatus of claim 17, wherein the second conductive surface area of the second set of electrodes provides a uniform signal distribution in the signals regardless of a location of a touch detected on the capacitive sense array.

19. The apparatus of claim 17, wherein the second conductive surface area of the second set of electrodes provides a higher linear overlap of a touch in a region between two intersections.

20. The apparatus of claim 17, wherein the first set of electrodes and the second set of electrodes are disposed on a single layer, wherein at least one of the first set of electrodes comprises a second non-uniform conductive pattern, wherein the second non-uniform pattern comprises tessellated cross shapes disposed along a first axis, each of the tessellated cross shapes comprising four segments that taper in width towards a center of the four segments, and wherein the non-uniform pattern comprises tessellated star shapes disposed along a second axis and disposed to interlock with the tessellated cross shapes, each of the tessellated star shapes comprising four additional segments that taper in width away from a center of the four additional segments.

* * * * *